INVENTOR
LUTHER H. HAIBT
BY John E. Dougherty Jr.
ATTORNEY

Sept. 17, 1963 L. H. HAIBT 3,104,380

MEMORY SYSTEM

Filed Nov. 27, 1959 4 Sheets-Sheet 4

3,104,380
MEMORY SYSTEM
Luther H. Haibt, Croton-on-Hudson, N.Y., assignor to International Business Machines Corporation, New York, N.Y., a corporation of New York
Filed Nov. 27, 1959, Ser. No. 855,622
2 Claims. (Cl. 340—174)

The present invention relates to a memory system, as well as a storage device used in the system and, more particularly, to a memory system using this storage device which is addressed by comparing all or a portion of each word stored in the system with a plurality of address values termed an input or interrogation tag.

The term associative memory system has been applied to that type of memory system which may be addressed for one or more functional operations by comparing an input or interrogation tag with all or a portion of each word stored in the memory. In one type of associative memory system, two separate memories are used. One memory is termed a word memory and stores the information words. The other memory is termed a tag memory and stores identifying tags for the words stored in the word memory. Memories of this type are addressed by comparing each of the identifying tags in the tag memory with an input or interrogation tag. Where a comparison is achieved, an output indicative of the comparison is manifested and this output is utilized, for example, to read out the word associated with the tag on which the comparison is realized. As is shown and described in copending application Serial No. 855,627 filed in behalf of the inventor of the subject application on even date herewith, different types of tags may be stored in the tag portion of the memory and these tags used to control different functional operations in the memory. In a second type of tag memory, only a single memory is used which stores the information words. This memory is addressed by comparing an interrogation tag with all or a portion of each of the words stored in the memory. Once a comparison has been realized, various functional operations such as read out or erase may be performed. If associative memory systems are to realize to the fullest extent the capabilities inherent in this mode of memory operation, it is desirable that the design be such that comparison operations may be performed selectively on all or any portion of each word stored in the memory, and further, that all such comparison operations should, as far as possible, be simultaneous, that is, comparisons on binary ones and binary zeros should be performed simultaneously on all tags or words or selected portions thereof. One difficulty in designing a system having these attributes is that of providing a type of storage device and mode of operation which are usable in all types of associative memory systems, and at the same time, which allow such systems to be fabricated using, as the storage medium, whatever storage element is best suited in terms of economy and reliability for the particular application.

In accordance with the principles of the present invention, a novel memory system of the associative type is provided wherein the storage devices for storing the tag, or portions of the word on which the comparison operations are performed, each include two storage elements. These elements are herein disclosed as magnetic cores since the practicality and reliability of this type storage element in large scale computing systems has been proven by commercial usage over a period of years. Each of the cores in each pair forming a storage device in this system is capable of assuming first and second different states of flux remanence. Each pair of cores stores a binary one when the first core is in the first stable state and the second core is in the second stable state, and stores a binary zero when the first core is in the second stable state and the second core is in the first stable state. Comparison operations are performed on individual storage devices by applying a binary one representing signal to a winding on the first core when a comparison on a binary one is to be performed, and by applying a binary zero representing signal to a winding on the second core when a comparison on a binary zero is to be performed. The flux orientation in the cores is such that each is effective when such a signal is applied to provide an output on an output line linking both cores only when the signal is applied to the core when it is in the second stable state. Thus, an output signal is produced on the output line only when the value stored in the core is different than the value represented by the signal applied to the core. The output signal realized is the same regardless of whether it is produced by the first core in response to a binary one representing signal when the storage device is storing a binary zero, or is produced by the second core in response to a binary zero representing signal when the storage device is storing a binary one. Since the output on the output line is the same regardless of the type of mismatch, each group of storage devices storing a word or tag or information in the memory may be provided with a single output line and a comparison operation may be performed during which binary one and binary zero signals representing the value of the interrogation tag are applied simultaneously to different ones of the storage devices in the group. During such an operation there is no danger of an output produced on the output line due to a mismatch of one type cancelling an output produced due to a mismatch of the other type. Further, since a comparison is indicated by the lack of an output signal on the output line, comparison operations may be selectively performed on any number of the storage devices in the group since output signals indicating a mismatch can be produced only by storage devices to which comparison signals are actually applied. Thus, it is possible to selectively compare on any one or more of the storage devices in any group which is storing an information word or tag.

It is, therefore, an object of the present invention to provide an improved associative memory system.

It is a further object to provide a storage device particularly adapted for storing the information on which the comparison operations for addressing an associative memory system are performed.

It is still another object to provide an improved associative memory system wherein the storage devices storing the information on which the comparison operations for addressing the memory are performed each include two bistable storage elements, and wherein comparison operations are performed by applying binary one representing signals to one of the storage elements only in each storage device and applying binary zero representing signals to the other storage element only in each storage device.

Another object is to provide an improved associative memory system wherein the memory may be addressed by comparison operations selectively performed on different portions of each word or tag stored in the memory.

It is still another object to provide an improved associative memory system using magnetic cores as storage elements wherein both binary zero and binary one values of an interrogation tag may be simultaneously compared with the values of tags or portions of words stored in the memory.

The foregoing and other objects, features and advantages of the invention will be apparent from the following more particular description of preferred embodiments of the invention, as illustrated in the accompanying drawings.

In the drawings:

FIG. 2 shows the manner in which FIGS. 2A, 2B, and 2C are arranged to form a circuit diagram of applicant's system.

Figures 2, 2A:
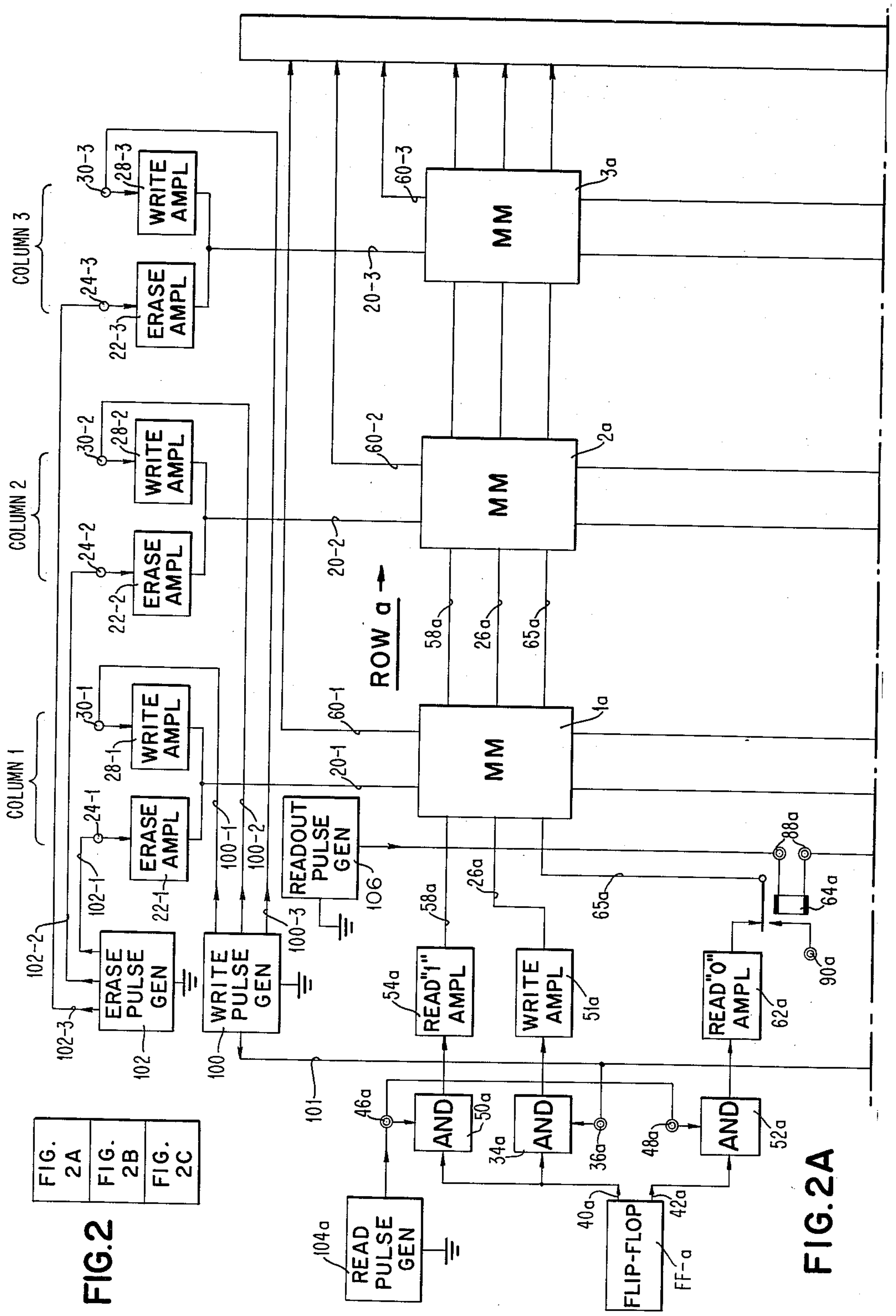
Figure 2B:
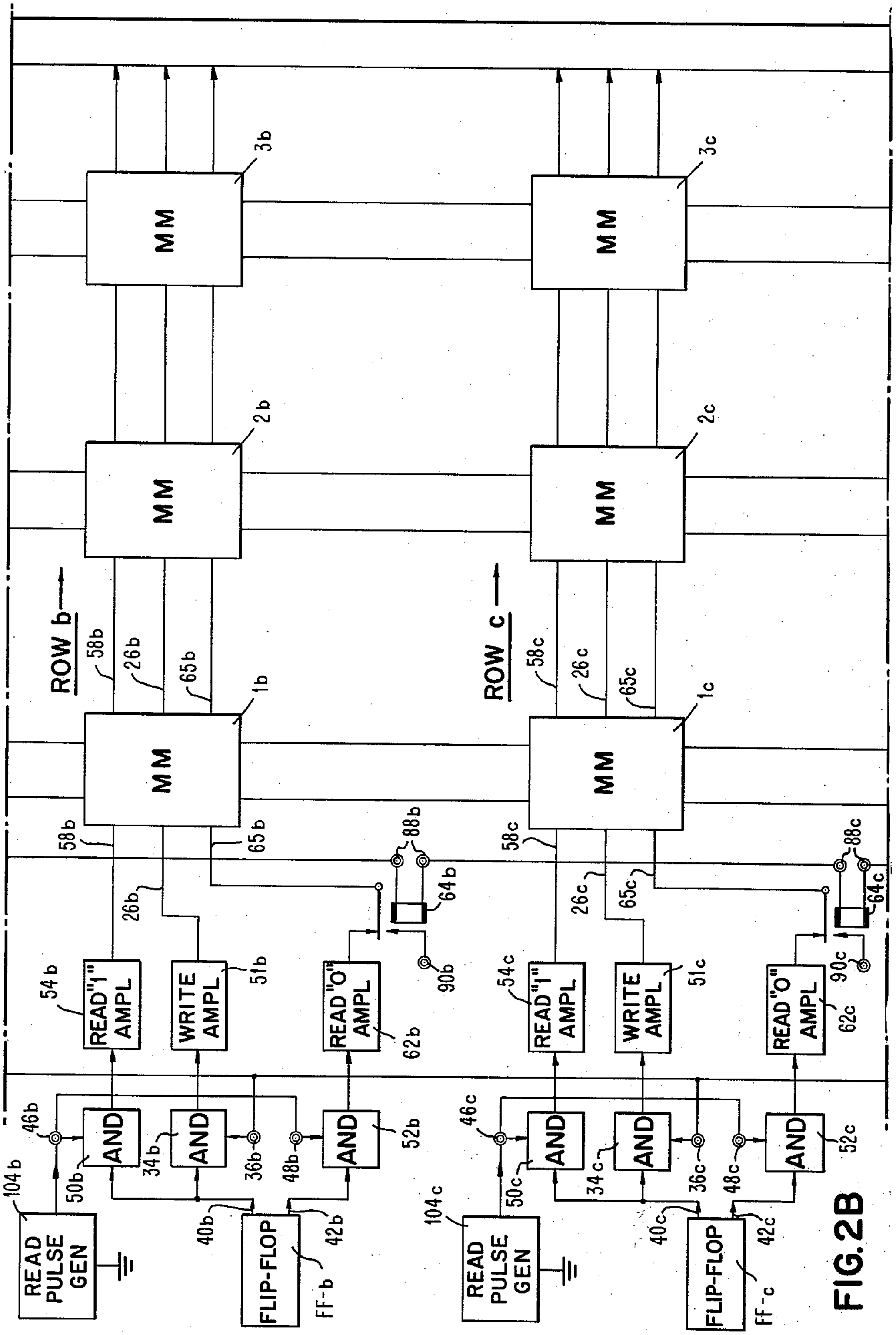
Figure 2C:
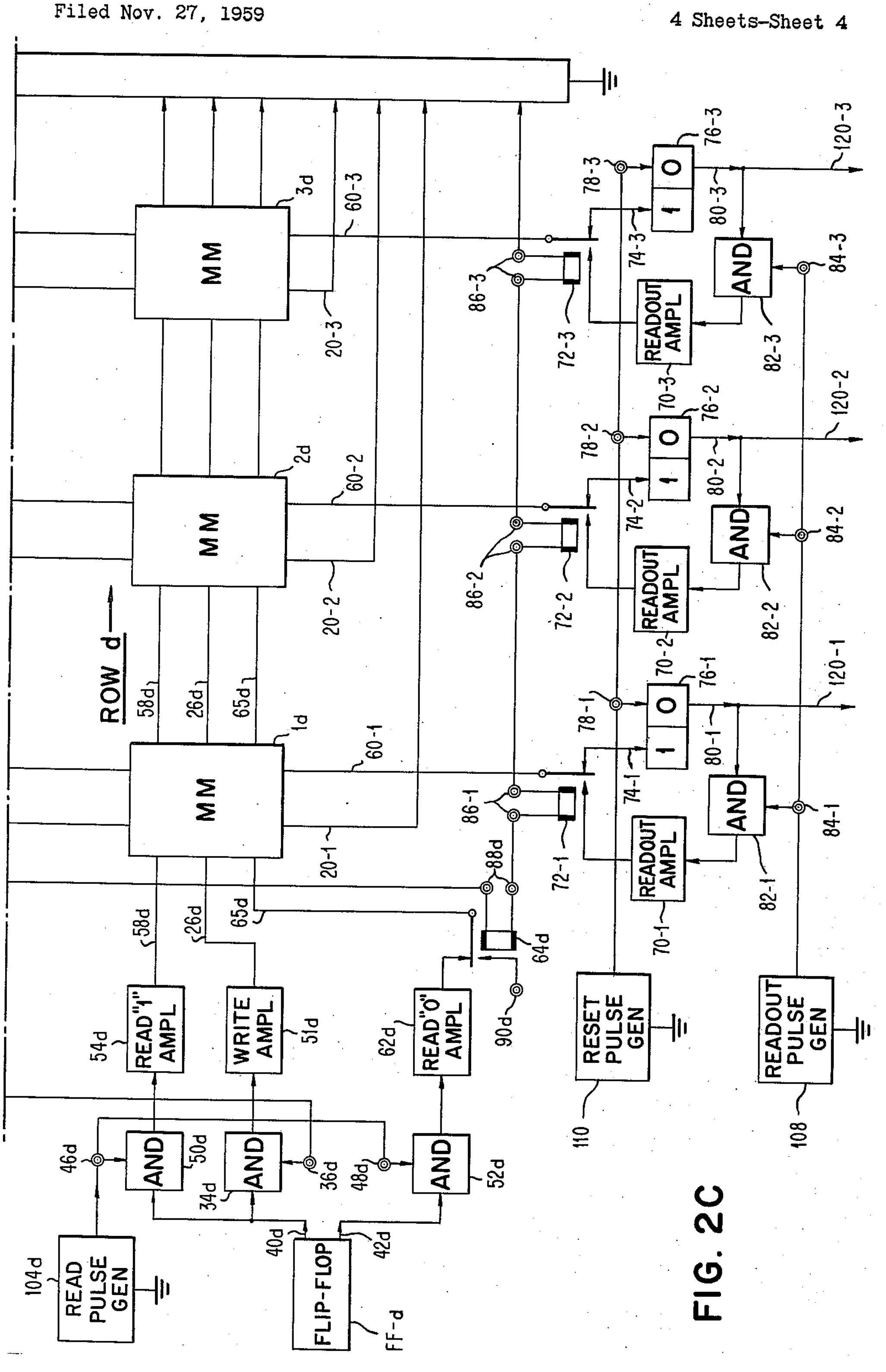

FIGS. 2A, 2B, and 2C taken together and arranged as shown in FIG. 2, form a schematic circuit diagram of one embodiment of applicant's associative memory system.

Figures 1, 1A:
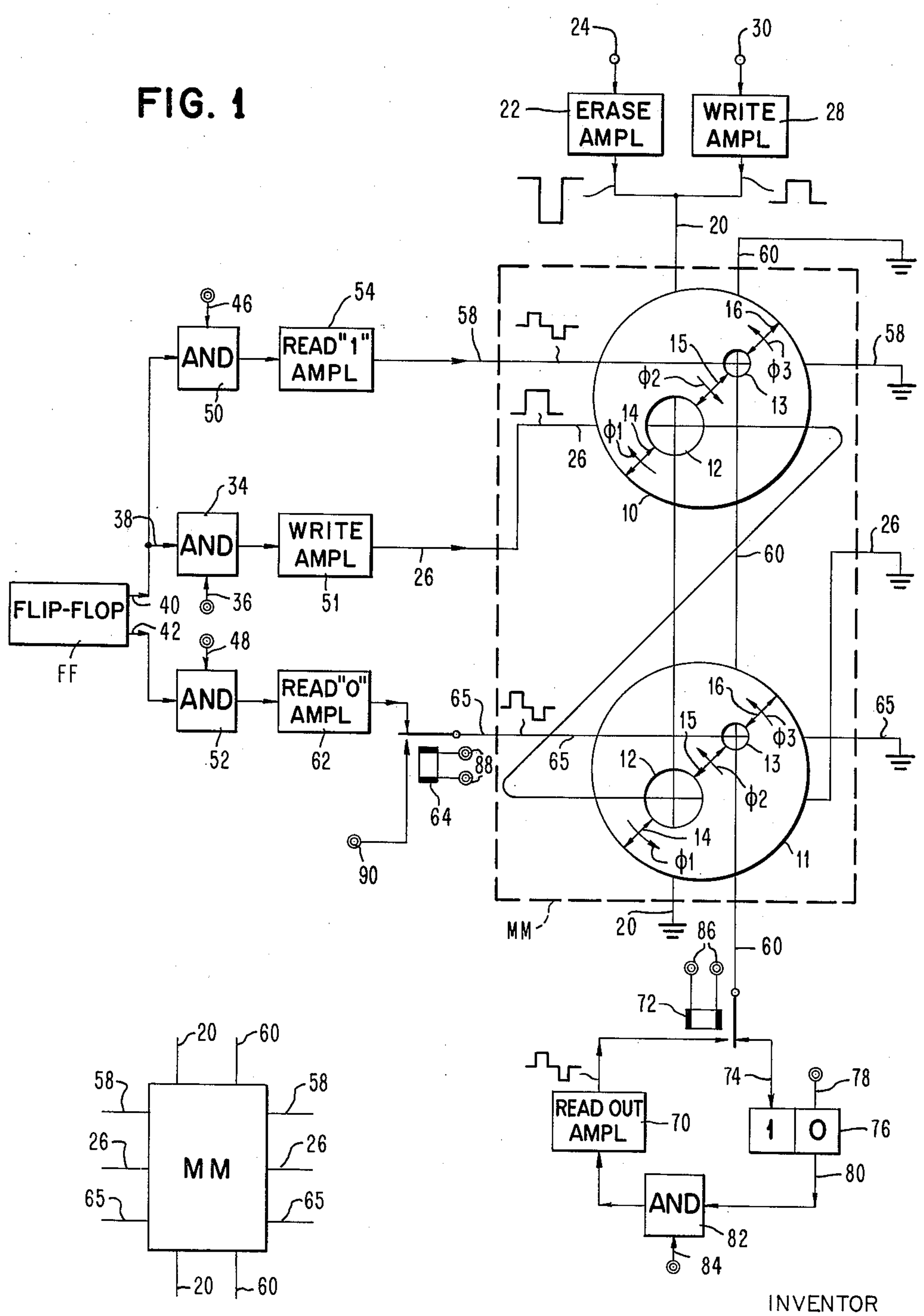
FIG. 1 is a schematic representation of the basic storage devices used in applicant's system together with circuits which are employed to control the device to perform the various functional operations required of it in the system.
FIG. 1A is a block diagram representation of the storage device of FIG. 1, which block diagram representation is used in the system diagram of FIGS. 2A, 2B, and 2C.

FIG. 1 shows the structure of a single storage device of applicant's system together with the input and output lines, and associated circuitry which control the operation of the structure in performing the functions required of it in the system. The basic storage device includes two storage elements in the form of cores 10 and 11, which are fabricated of a magnetic material having a rectangular hysteresis characteristic. The construction and operational characteristics of these cores are described in detail in an article entitled "The Transfluxer" which appeared in the Proceedings of the IRE, March 1956, pages 321–328. Each of the cores 10 and 11 includes an input aperture 12 and an output aperture 13. These apertures divide the cores into three legs 14, 15 and 16. Legs 14 and 15 form a closed flux path around aperture 12. Legs 15 and 16 form a closed flux path around aperture 13. Each of the cores 10 and 11 has two stable states, one of which is termed a blocked state and the other of which is termed an unblocked state. Each core is said to be in a blocked state when the flux in its leg 15 is oriented in the same direction as the flux in leg 16. Conversely, each core is in an unblocked state when the flux in legs 15 and 16 is oriented in opposite directions. The storage devices formed by the two cores is said to be storing a binary one when the core 10 is in a blocked state and the core 11 is in an unblocked state. The two cores store a binary zero when the core 10 is unblocked and the core 11 is blocked.

In FIG. 1 the arrows designated $\phi 1$, $\phi 2$, and $\phi 3$ show the direction of the flux in the paths 14, 15 and 16, respectively, for the cores 10 and 11 when the storage device formed by these cores is storing a binary zero, that is, with core 10 in an unblocked state and core 11 in a blocked state. From this figure, it can be seen that in the unblocked core 10 the flux around aperture 12, including paths 14 and 15, is oriented in a clockwise direction and the flux around aperture 13, including paths 15 and 16, is oriented in a counterclockwise direction. In the unblocked core 11 the flux around aperture 12, including paths 14 and 15, is oriented in a counterclockwise direction and the flux in paths 15 and 16 is oriented in the same direction so that there is no completely closed path of unidirectionally oriented flux around aperture 13. In operation, the flux in path 16 is maintained in the direction indicated by the arrows $\phi 3$ for the paths 16 of cores 10 and 11 and the cores are switched between their blocked and unblocked states by changing the direction of flux orientation around apertures 12.

The cores are caused to assume a binary zero representing condition with the flux oriented as shown between arrows $\phi 1$, $\phi 2$, and $\phi 3$ in FIG. 1 by applying full select negative signals to a drive line 20 under control of an amplifier 22 which is termed an erase amplifier. The line 20 is threaded through the apertures 12 of both of the cores 10 and 11 and links the cores in opposite senses. Erase amplifier 22 is actuated to apply an erase or full select reset pulse to line 20 by applying a signal to a control input 24 for the amplifier. This causes a negative full select pulse to be applied to line 20, which pulse causes the flux around aperture 12 of core 10 to be oriented in a clockwise direction and the flux around aperture 12 of core 11 to be oriented in a counterclockwise direction so that the former core is set to its unblocked state and the latter core to its blocked state.

A binary one is written in the storage device formed by the cores by reversing the flux orientation around the aperture 12 for each core. This is accomplished by applying a half select positive pulse to line 20 and a similar half select positive pulse to another drive line 26 which is also threaded through the apertures 12 of cores 10 and 11 in opposite senses. By the term half select, it is meant that each of the positive pulses applied to lines 20 and 26 is, of itself insufficient to produce a flux reversal around the aperture 12 of either core, but when half select pulses of this type are simultaneously applied to both of these lines, a sufficient magnetomotive force is produced to cause a flux reversal around the aperture in both cores. Half select pulses are produced on line 20 by a write amplifier 28 in response to signals applied to an input terminal 30 for this amplifier. The half select pulses produced on line 26 come from a write amplifier 51 which receives control pulses from an AND circuit 34. AND circuit 34 is provided with two inputs 36 and 38. The input 36 receives control pulses when a write operation is to be performed. The other input 38 of AND circuit 34 is connected to the binary one output line 40 of flip flop FF. This flip flop is of conventional design and capable of assuming either a binary one or a binary zero state. The output line 40 is at a positive potential only when the flip flop is storing a binary one. The flip flop FF is also provided with a binary zero output line 42 which is at a positive potential only when the flip flop is storing a binary zero. Thus, it can be seen that if, when flip flop FF is storing a binary one, a control pulse is applied to the input 36 of AND circuit 34 and the input 30 of write amplifier 28, half select pulses are produced simultaneously on drive lines 26 and 20 to cause the flux around aperture 12 of core 10 to be reversed to a counterclockwise direction and the flux around aperture 12 of core 11 to be set in a clockwise direction. After such an operation, core 10 is blocked and core 11 is unblocked and a binary one is stored in the storage device formed by the two cores.

Once information has been entered in the storage device of FIG. 1, the cores may be interrogated in either of two ways. First, an interrogation signal representative of either a binary one or binary zero may be applied to the cores and an output produced indicative of whether the value represented by the interrogation signal does or does not compare with the value stored in the storage device formed by cores 10 and 11. This type of operation is called a comparison operation. The value stored in the cores may be also read out in response to an interrogation signal which produces an output pulse when a binary one is stored in the storage device and no output pulse when a binary zero is stored.

The circuit is controlled to perform a comparison operation by applying control pulses to the control inputs 46 and 48 of two AND circuits 50 and 52. The other input of AND circuit 50 is connected to the binary one output 40 of flip flop FF and the other input of AND circuit 52 is connected to the binary zero output 42 of this flip flop. Thus, when the flip flop FF is in a binary one state and control signals are applied to the inputs 46 and 48 of these AND circuits, a pulse is passed only through AND circuit 50 to an amplifier 54 which is termed the read "1" amplifier. This amplifier is effective, when it receives a pulse from AND circuit 50, to produce on line 58 an output signal in the form of a positive pulse followed by a negative pulse. Line 58 is threaded through the output aperture 13 of core 10. When the storage device formed by cores 10 and 11 is storing a binary zero, with core 10 unblocked and core 11 blocked and the flux in these cores is oriented as shown by arrows $\phi 1$, $\phi 2$, and $\phi 3$ in FIG. 1, the signal applied to line 58 is effective to produce successive flux reversals around the aperture 13 of core 10. These successive flux reversals cause successive output pulses to be produced on a line 60 which is also threaded through the output aperture 13 of both of the cores 10 and 11. Since both the plus and minus pulses which form the signal developed on line 58 by read "1" amplifier 54 produce flux reversals around aperture 13 of core 10, the core is returned to its initial state upon completion of the signal applied to line 58 and the operation is therefore non-destructive. When a signal of the same type is produced on line 58 under control of flip flop FF and AND circuit 50 at a time when the storage device is storing a binary one, no output is produced on line 60. This is so since, when cores 10 and 11 are storing a binary one, the core 10 is in a blocked state with the flux in paths 15 and 16 oriented in the same direction. Thus, the signal applied by amplifier 54 to line 58 is then ineffective to produce a flux reversal around aperture 13 of core 10 and no output signal is developed on line 60. Thus, it can be seen that when a comparison operation is performed with the flip flop FF in a binary one state, an output signal is developed on line 60 when the value stored by the cores is a binary zero and, therefore, does not compare with the value stored in the flip flop. When the value stored in the cores 10 and 11 is a binary one and, therefore, compares with the value stored in the flip flop, no output is produced on line 60.

The operation is similar when the flip flop FF is storing a binary zero, in which case, the application of signals to the control inputs 46 and 48 of AND circuits 50 and 52 causes an input signal to be applied to an amplifier 62 which is a read "0" amplifier. The output of this amplifier is connected through the normally closed point of a relay 64 to a line 65 which is threaded through the output aperture 13 of core 11. Amplifier 62 also provides a signal in the form of successive plus and minus pulses. When the storage device formed by cores 10 and 11 is storing a binary zero, core 11 is in a blocked state and the application of this signal to line 65 does not produce any flux reversal around aperture 13 of this core. No output pulse is then developed on line 60, indicating that the value stored in the storage device compares with the value stored in the flip flop. However, when the storage device is storing a binary one and core 11 is unblocked, the signal on line 65, representing the binary zero stored in flip flop FF, produces successive flux reversals around aperture 13 of core 11 causing an output signal to be produced on line 60, indicating that the value in the flip flop FF does not compare with the value stored in the storage device formed by cores 10 and 11.

Thus, it can be seen that a comparison operation is effected by applying signals to the control inputs 46 and 48 of AND circuits 50 and 52 and, during such an operation, an output is produced on line 60 only when the value stored in the flip flop FF does not compare with the value stored in the cores 10 and 11. Further, and this is an important feature of the invention, when there is a mismatch, that is, either when the flip flop is in a binary zero state and the storage device in a binary one state, or when the flip flop is storing a binary one and the storage device is storing a binary zero, the output signal developed on line 60 is the same, that is, it is in the form of successive plus and minus signals. This is so since, in each case, the output signal is produced by a signal of the same characteristics on either line 58 or 65 which causes flux reversals in the same direction around the appropriate one of the output apertures 13. Since the output signal developed on line 60 is the same regardless of the type of mismatch, it should be apparent that a plurality of storage devices, each made up of a pair of cores such as cores 10 and 11, might have a single output line such as 60, threaded through the aperture of each core. When the values stored in a number of pairs of cores having the same output line threaded through their output apertures are simultaneously compared with the values stored in associated flip flops, a signal will be produced on the output line if the value stored in any one of the pairs of cores does not compare with the value stored in the flip flop with which that pair of cores is associated. If there is a mismatch between more than one flip flop and an associated pair of cores, the output signal generated merely increases in magnitude.

The second type of interrogation operation which is mentioned above is here termed a read out operation and is performed under control of pulses produced by a read out amplifier 70. The operation of this amplifier is controlled by comparison operations of the type described above during which an output is produced on line 60 when the value stored in the cores 10 and 11 does not compare with the value stored in flip flop FF. Line 60 is connected through the normally closed point of a relay 72 to the binary one input 74 of flip flop 76. Prior to each comparison operation, a signal is applied to the flip flop to set it in its binary zero state. The flip flop is provided with a binary zero output 80 on which there is manifested a positive potential as long as the flip flop remains in its binary zero state. When, after this flip flop is set in its binary zero state, a comparison operation is performed during which a signal is developed on line 60, indicating a mismatch, the flip flop 76 is set to its binary one state and the potential on its binary zero output line 80 is reduced to zero. However, when the values in the flip flop FF and storage device formed by cores 10 and 11 compare, flip flop 76 remains in its binary zero state and the potential on the binary zero output line 80 for the flip flop remains positive. This potential is applied as an input to AND circuit 82. During read out operations a signal is applied to the control input 84 of this AND circuit, causing a pulse to be produced on the output of the AND circuit and applied as an input to read out amplifier 70. At the same time, a read out control pulse is applied to a pair of terminals 86 which are connected to the coil of relay 72, and a pair of terminals 88, which are connected to the coil of relay 64 causing each of these relays to transfer and complete electrical connections through their normally open points. The signal applied through AND circuit 82 to read out amplifier 70 causes a read out signal in the form of successive plus and minus pulses to be developed by this amplifier and passed through the now closed normally open contacts of relay 72 to line 60. This signal on line 60 produces successive flux reversals around the aperture 13 of the one of the cores 10 and 11 which is then in an unblocked state. Core 10 is in an unblocked state when the storage device is storing a binary zero and core 11 is in an unblocked state when the storage device is storing a binary one. Thus, when a signal is applied to line 60 by read out amplifier 70 at a time when the storage device formed by cores 10 and 11 is storing a binary one, a pulse is produced on line 65 which is threaded through aperture 13 of core 11. Similarly, a pulse is developed on line 58, which is threaded through aperture 13 of core 10, when a signal is applied by read out amplifier 70 to line 60 when cores 10 and 11 are storing a binary zero. Output line 58 is connected only to the output read "1" amplifier 54 and the pulse developed on this line has no effect. The outputs during a read out operation are manifested at terminal 90 which is connected through the now closed normally open point of relay 64 to the line 65 which is threaded through the output aperture 13 of core 11. A pulse is produced on this line during a read out operation when the cores 10 and 11 are storing a binary one and no pulse is produced on this line when these cores are storing a binary zero. It should be noted that the relays 64 and 72 are actuated only during read out operations so that the pulses applied to line 65 by the read "0" amplifier 62 are not transmitted to output terminal 90 and also the output pulses developed on line 60 during compare operations are not applied to read out amplifier 70. It is, of course, obvious that if desired, the points of a relay similar to the relay 64 may be connected between read "1" amplifier 54 and drive line 58 and a binary zero output terminal connected to the normally open point of this relay so that, during a read out operation, an output pulse is produced at this output terminal when the cores 10 and 11 are storing a binary zero and, as described above, a pulse is produced on output terminal 90 when the cores are storing a binary one.

It should be noted that the function of the lines 65 and 60 which are threaded through the output apertures 13 of core 11 are reversed during compare and read out operations. During a compare operation line 65 serves as an input line which is energized under control of the amplifier 62 and line 60 serves as an output line. During a read out operation, line 60 serves as an input line which receives pulses from read out amplifier 70 and line 65 serves as an output line.

FIGS. 2A, 2B, and 2C, arranged as shown in FIG. 2, show the manner in which a number of storage devices of the type shown in FIG. 1 are arranged to form a complete system. In the system diagram of FIGS. 2A, 2B, and 2C, each of the storage devices is formed of two cores such as are shown in FIG. 1 and each storage device is represented by a block designated MM. The portion of the structure of each storage device represented by the block representation corresponds to that shown in the dotted block MM of FIG. 1 and the block representation together with the various input and output lines for the storage device, properly designated, are shown in FIG. 1A.

There are twelve of the storage devices MM in the system of FIGS. 2A, 2B, and 2C, arranged in vertical columns and horizontal rows, with four storage devices in each column and three storage devices in each row. The rows from top to bottom are designated rows *"a," "b," "c,"* and *"d,"* and the columns, from left to right, are designated as columns 1, 2, and 3. Each of the storage devices MM is identified by a designation representing the column and row which define its position in the memory. Thus, for example, the storage device MM at the upper left corner of the memory is designated 1*a*, indicating that it is located at column 1, row *"a"* of the memory. The various control and amplifier circuits which supply the pulses to control the various operations of the storage devices, in a manner described with reference to FIG. 1, are identified with the same numerals as are used in FIG. 1, with the exception that one of the letters *"a," "b," "c,"* or *"d"* is added to indicate the row of the memory with which the particular circuit is associated, or one of the numerals 1, 2, or 3 is added to indicate the particular column of the memory with which the particular device is associated. Thus, for example, the read "1" amplifier for the storage devices in row *"a"* of the memory is designated 54*a*, whereas the erase amplifier for the storage devices in column 1 of the memory is designated 22–1. The various pulse generators which apply the pulses to the AND circuits, relays and flip flops to control the operation of the storage devices are identified in FIGS. 2A, 2B, and 2C, beginning with the numeral 100. These pulse generators are a write pulse generator 100 (FIG. 2A), erase pulse generator 102 (FIG. 2A), four read pulse generators 104*a* (FIG. 2A), 104*b* (FIG. 2B), 104*c* (FIG. 2B) and 104*d* (FIG. 2C), two read out pulse generators 106 (FIG. 2A) and 108 (FIG. 2C), and a reset pulse generator 110 (FIG. 2C).

The erase, write, read (compare), and read out operations are performed on the storage devices of this system in the same manner as described for the single device of FIG. 1. Each column of the memory stores bits of information which are considered an information word and operations are performed with respect to the three words of information which can be stored in the three columns of the memory, it being understood that applicant's disclosed 3 by 4 system is merely illustrative and the same principles may be used in building much larger systems.

An erase operation is performed by actuating the erase pulse generator 102. This pulse generator has three output lines 102–1, 102–2 and 102–3, and the generator may be selectively actuated to produce a pulse on any one of these output lines. If an output is produced on line 102–1, for example, a signal is applied to the input 24–1, of erase amplifier 22–1. As described with reference to FIG. 1, this amplifier produces a full select negative pulse on line 20–1, which causes each of the storage devices in column 1 of the memory to be reset to its binary zero representing state. Each of the three columns of the memory are successively reset by actuating erase pulse generator 102 to successively develop output pulses on lines 102–1, 102–2, and 102–3.

Once the memory has been entirely erased, information words may be written in the memory under the control of write pulse generator 100. Prior to each such write operation, the word to be written in the memory is entered in an input register formed by four flip flops, FF-*a*, FF-*b*, FF-*c*, and FF-*d*. After this has been accomplished, write pulse generator 100 is actuated. This pulse generator supplies pulses to four output lines 100–1, 100–2, 100–3, and 101. Each time the write pulse generator is actuated, a pulse is applied to the latter line 101 and, selectively, to one of the other three lines 100–1, 100–2, and 100–3, in accordance with the column in the memory in which the new word of information is to be written. Thus, when the new word of information is to be written in the column 1 of the memory, write pulse generator 100 is actuated to produce pulses on lines 100–1 and 101. The pulse on line 100–1 is applied to the input terminal 30–1 for the write amplifier 28–1 for column 1 of the memory. This amplifier, in response to this input pulse, produces a positive half select pulse which is applied to each of the storage devices in column 1 of the memory. At this time, the output pulse developed on line 101 of write pulse generator 100 is applied to the control inputs 36*a*, 36*b*, 36*c*, and 36*d* of AND circuits 34*a*, 34*b*, 34*c*, and 34*d*. The other input of each of these AND circuits is connected to the binary one ouputs 40*a*, 40*b*, 40*c*, and 40*d* of the corresponding one of the flip flops forming the input register. The binary one output line for each of the flip flops which is in a binary one state is at a positive potential so that for each of these flip flops a one is transmitted through the corresponding AND circuit to the write amplifier for that row. For example, if the word to be written in the memory is 1111, input pulses are applied to each of the write amplifiers 51*a*, 51*b*, 51*c*, and 51*d*, causing half select positive pulses to be generated on each of the lines 26*a*, 26*b*, 26*c*, and 26*d*. These half select pulses are applied by each of these lines to each of the storage devices in the corresponding row of the register and, since these pulses are applied simultaneously with the pulse applied by write amplifier 28–1 to line 20–1, each of the storage devices of column 1 of the memory is switched to its binary one state. Since the storage device in columns 2 and 3 of the memory are subjected only to the half select pulses generated on lines 26*a* through 26*d*, with no pulses being present on lines 20–2 and 20–3 at this time, the storage devices in these columns of the memory remain in their binary zero state. If the word entered in the input register formed by flip flops FF-*a*, FF-*b*, FF-*c*, and FF-*d* had a binary zero in any position, for example, in flip flop FF-*a*, no pulse is transmitted as an input to the corresponding write amplifier 51*a* and line 26*a* is not energized with a half select pulse. The half select pulse applied to line 20–1 is insufficient of and by itself to change the state of the storage device MM-1*a* and, therefore, this storage device remains in its binary zero state.

Information words may be written in columns 2 and 3 of the memory in the same manner. First, the word to be written is entered in the input register formed by flip flops FF-*a* through FF-*d* and then write pulse generator 100 is actuated to produce a pulse on line 10 and, simultaneously, a pulse on the proper one of the lines 100–2 and 100–3.

Once one or more information words have been entered in the memory by writing operations such as described above, the memory may be interrogated by a comparison operation. The first step in such an operation is to enter the information word for which the memory is to be interrogated in the input register formed by the flip flops FF-*a* through FF-*d*. Then the reset pulse generator 110 (FIG. 2C) is actuated to reset each of the flip flops 76–1, 76–2, and 76–3 to its binary zero state. When this has been accomplished, the read pulse generators **104*a*, 104*b*, 104*c*, and 104*d*** are simultaneously energized to apply pulses to the AND circuits which control the comparison operation. Thus, considering the circuitry for row "*a*" as exemplary, read out pulse generator **104*a* applies signals to the control inputs 46*a* and 48*a* of AND circuits 50*a* and 52*a*. The other inputs of AND circuits 50*a* and 52*a* are respectively connected to the binary one and zero outputs 40*a* and 42*a*** for flip flop FF-*a*. If this flip flop is storing a binary one, a pulse is passed through AND circuit **50*a* to read amplifier 54*a* causing an interrogation signal in the form of successive plus and minus pulses to be applied by line 58*a*** to each of the storage devices in row "*a*" of the memory. As explained above with reference to FIG. 1, line **58*a* is threaded through the output aperture for the upper one of the cores in each storage device (e.g. core 10 in FIG. 1). This core is in a blocked state when the storage device is storing a binary one and in an unblocked state when the storage device is storing a binary zero. Thus, the pulse applied by read "1" amplifier 54*a* to line 58*a***, representing the binary one stored in flip flop FF-*a*, causes an output signal to be generated on the proper one of the output lines 60–1, 60–2, and 60–3 for each one of the storage devices **1*a*, 2*a*, and 3*a* which is then in its binary zero state. Thus, for example, if storage device 1*a* is at this time storing a binary one and storage devices 2*a* and 3*a* are storing binary zeros, no output signal is produced on line 60–1 in response to the signal on line 58*a* but output signals are produced on lines 60–2 and 60–3** in response to this signal.

If the flip flop FF-*a* is in a binary zero state when the signals are applied by read pulse generator **104*a* to the control inputs 46*a* and 48*a* of AND circuits 50*a* and 52*a*, the comparison operation is performed by a signal applied to line 65*a* by the read "0" amplifier 62*a* in response to the pulse transmitted through AND circuit 52*a*. In such a case, output pulses indicative of no comparison are produced on the associated one of the output lines 60–1, 60–2, and 60–3** by each of the storage devices in row "*a*" of the memory which is then storing a binary one. The comparison operations on the storage devices in the other rows of the memory are carried on simultaneously with that performed for row "*a*" since the read pulse generators **104*a* through 104*d*** apply control signals to the appropriate AND circuits at the same time. Thus, in accordance with the values stored in the flip flops FF-*a* through FF-*d*, interrogation signals are simultaneously applied to one of each pair of lines **58*a* and 65*a*, 58*b* and 65*b*, 58*c* and 65*c*, and 58*d* and 65*d***. If the word stored in any one of the columns of the memory does not compare exactly with the input or interrogation word entered in the input register formed by the flip flops FF-*a* through FF-*d*, one or more of the storage devices in that column will cause an output signal indicative of the fact of no comparison to be produced on the appropriate one of the output lines 60–1, 60–2, and 60–3. However, if the word in one of the columns of the memory compares exactly with the word entered in the input register, no output is produced on the output line for the column in which that word is stored. Thus, for example, if the word entered in the flip flops FF-*a* through FF-*d* compares exactly with the word stored in column 1 of the memory, but does not compare exactly with the words stored in columns 2 and 3 of the memory, output signals indicative of no comparison are produced on output lines 60–2 and 60–3 and no output signal is produced on output line 60–1. When the output signals produced on lines 60–2 and 60–3 are applied to the binary one inputs 78–2 and 78–3 of flip flops 76–2 and 76–3, respectively, each of these flip flops is set to its binary one state, whereas, flip flop 76–1 remains in its binary zero state indicating a comparison for this column of the memory.

Once the column of the memory has been selected by a comparison operation, such as described above, and an indication of the comparison manifested by the state of the corresponding one of the flip flops 76–1, 76–2, and 76–3, subsequent operations such as a read out, write, and erase operations can be performed on this column of the memory.

A read out operation is performed in a column of the memory selected by a comparison operation such as is described above by actuating read out pulse generators 106 (FIG. 2A) and 108 (FIG. 2C). The pulse generator 106 applies a pulse to the coils of relays **64*a*, 64*b*, 64*c*, 64*d*, 72–1, 72–2, and 72–3 to cause the contacts of each of these relays to transfer. Read out pulse generator 108 applies a pulse to the control input of each of the AND circuits 82–1, 82–2, and 82–3. Each of these AND circuits has its other input connected to the binary zero output line 80–1, 80–2 and 80–3 of a corresponding one of the flip flops 76–1, 76–2 and 76–3. During the above described comparison operation, each of these flip flops, with the exception of the one for the column on which a comparison is achieved, is switched to its binary one state. The flip flop on which a comparison is achieved, for example flip flop 76–1, remains in its binary zero state. Therefore, when the signal is applied by pulse generator 108 to control input 84–1 of AND circuit 82–1, this AND circuit applies a signal to read out amplifier 70–1. In response to this signal, this amplifier produces an output signal in the form of successive plus and minus pulses which pass through the now closed normally open contact of relay 72–1 to line 60–1. This line, as is shown in FIG. 1, links the output apertures of both cores in each pair which forms a storage device in column 1 of the memory. The signal on this line causes the lowermost core of each storage device (core 11 in FIG. 1) to undergo successive flux reversals around its aperture 13 only when that storage device is storing a binary one. As a result, an output signal is produced on each of the lines 65*a* through 65*d* for which the corresponding storage device in column 1 of the memory is storing a binary one. The output signals on these lines are transmitted through the now closed normally open points of relays 64*a* through 64*d* to the corresponding output terminals 90*a* through 90*d*. No signal is produced on any one of the output lines 65*a* through 65*d* when the corresponding storage device in column 1 of the memory is in a binary zero state. Therefore, the values forming the word stored in the column interrogated during the read out operation are manifested by the presence or absence of signals on terminals 90*a* through 90*d***.

The basic operations of erase, write, comparison and read out, as described above, may be performed in any desired sequence in the memory of FIGS. 2A, 2B, and 2C. Memories of the type shown may be employed as a tag memory in an associative memory system of the type wherein there are two distinct memories, the tag memory and the word memory. For each word stored in the word memory, a corresponding tag is stored in the tag memory. Read out operations in such a memory are performed by comparing the tag for a desired word with all of the tags stored in the tag memory. When a comparision is achieved, the word corresponding to that tag is read out of the word memory. When a comparison is achieved on any column of the memory shown during a comparison operation, one of the flip flops 76–1 through 76–3, remains in its binary zero state. The flip flops for the columns storing tags which do not compare with the tag for which the memory is interrogated are set in their binary one states during the comparison operation. As described above, the flip flop which indicates a comparison by remaining in its binary zero state is employed to control a subsequent read out operation in the memory. In a similar manner, the same trigger may be employed to transmit a pulse, for example, via the corresponding one of a plurality of output lines 120–1, 120–2, and 120–3 to read out a word stored in a word memory which corresponds to the tag stored in the column in which the comparison was realized. As associative memory system of this general type employing, as a component, a tag memory similar to the memory of the subject application as shown and described in the above cited copending application Serial No. 855,627 filed in behalf of the inventor of the subject memory system on the same date as the subject application.

In other associative memory systems, there are no distinct tag and word memories, but a single memory which includes all of the information which is stored. In some such memories, interrogations are performed by comparing an interrogation tag or word with the entire word stored in each column of the memory. This is the mode of operation described above in accordance with which a four bit word is entered in the register formed by flip flops FF-*a* through FF-*d* and this four bit word is compared in its entirety with each of the four bit words stored in the columns of the memory shown. It is also possible, and in many cases desirable in operating memories of this type, to control the selection of a particular column of the memory for a particular functional operation by performing a comparison operation on a portion only of each of the words stored in the memory. Thus, a comparison may be performed on the basis of a two bit word or tag stored, for example, in flip flops FF-*a* and FF-*c*. The values of these bits are compared with the values stored in rows "*a*" and "*c*" for each word stored in the memory. During such an operation, as before, all of the flip flops 76–1 through 76–3 are initially reset to a binary zero state by a pulse from reset pulse generator 110 (FIG. 2C). Then read pulse generator **104*a* and read pulse generator 104*c*** are energized to initiate the comparison operation. Since no comparison is to be performed on rows "*b*" and "*d*" of the memory, read pulse generators **104*b* and 104*d* are not energized at this time. In the manner above described, the application of the pulses from read pulse generators 104*a* and 104*c*** cause a signal representative of either a binary one or a binary zero, according to the state of the flip flops FF-*a* and FF-*c* to be produced on one of the other of the lines **58*a* and 65*a* and one of the other of the lines 58*c* and 65*c*. Since at this time, no pulse is applied to either of the lines 58*b* and 65*b*, or either of the lines 58*d* or 65*d*, no outputs can be produced on the output lines 60–1 through 60–3** by the cores forming the storage devices in rows "*b*" and "*d*" of the memory. If we consider that, during the above described operation, the value stored in flip flops FF-*a* and FF-*c* correspond to the values stored in storage devices **1*a* and 1*c* of column 1 of the memory and are different in one or both orders from the values stored in storage positions 2*a* and 2*c* of columns 2 and 3*a* and 3*c* of column 3 of the memory, output signals indicative of no comparison are produced on lines 60–2 and 60–3 to set flip flops 76–2 and 76–3 to their binary one state. Flip flop 76–1 remains in its binary zero state and the positive potential on its binary zero output line 80–1 may be utilized to control read out of the entire word stored in column 1** of the memory.

Thus, it can be seen the comparison operation may be selectively performed on any portion of the words stored in the columns of the memory in FIGS. 2A, 2B, and 2C. This is made possible by the fact that a comparison is indicated by the absence of an output signal and no output can be produced by any one of the storage devices during a comparison operation unless a binary one or a binary zero signal is applied to the proper one of the lines **58*a* through 58*d*, or 65*a* through 65*d* for the row in the memory in which the storage device is connected. Thus, when during a comparison operation, one or more of the read pulse generators 104*a* through 104*d*** is not actuated, the operation is the same as if a comparison had been achieved for each storage device in each row of the memory.

While the invention has been particularly shown and described with reference to preferred embodiments thereof, it will be understood by those skilled in the art that various changes in form and details may be made therein without departing from the spirit and scope of the invention.

What is claimed is:

1. In a memory system of the type including a plurality of storage devices arranged in columns and rows wherein a word of information is stored in the storage devices in each column and the memory is addressed by comparing a portion only of each word stored in the memory system with an interrogation tag; a plurality of compare means each coupled to the storage devices in an associated row of said memory system; a plurality of output lines each coupled to the storage devices in an associated column of said memory system; each of said storage devices including first and second storage elements each capable of assuming first and second stable states; each said storage device storing a binary one when the first storage element is in said first stable state and the second storage element is in said second stable state and storing a binary zero when the first storage element is in said second stable state and the second storage element is in said first stable state; each of said compare means including a binary one signal line coupled to the first storage element of each of the storage devices in the row with which the compare means is associated and a binary zero signal line coupled to the second storage element of each of the storage devices in the row with which the compare means is associated; each of said output lines being coupled to both the first and second storage elements for the storage devices in the column with which it is associated; and means for causing the tag to be compared with the portion of each of the words stored in selected rows in said memory by applying energizing signals representative of the values in said tag to the compare means associated with the selected rows; each of said storage devices being effective to produce an output signal on the output line associated therewith only when the value stored therein does not compare with the value of the tag represented by a signal applied to the compare means associated therewith; whereby a simultaneous comparison is effected between the values of the said interrogation tag and the values of said words in said selected rows of said memory and a signal is produced on the output line for any column only when the compare means for one or more storage devices in that column has applied to it an energizing signal representative of a value of a tag which is different than the value stored in the storage device.

2. The memory system of claim 1 wherein each of said storage elements comprises a core of magnetic material capable of assuming first and second states of flux remanence.

References Cited in the file of this patent

UNITED STATES PATENTS

| | | |
|---|---|---|
| 2,719,773 | Karnaugh | Oct. 4, 1955 |
| 2,802,953 | Arsenault | Aug. 13, 1957 |
| 2,932,688 | Wright et al. | Apr. 12, 1960 |
| 2,935,732 | Guerber | May 3, 1960 |
| 2,973,508 | Chadurjian | Feb. 28, 1961 |
| 3,031,650 | Koerner | Apr. 24, 1962 |